United States Patent [19]

Shimp

[11] Patent Number: 4,608,434
[45] Date of Patent: Aug. 26, 1986

[54] METAL CARBOXYLATE/ALCOHOL CURING CATALYST FOR POLYCYANATE ESTER OF POLYHYDRIC PHENOL

[75] Inventor: David A. Shimp, Prospect, Ky.

[73] Assignee: Celanese Corporation, New York, N.Y.

[21] Appl. No.: 789,679

[22] Filed: Oct. 21, 1985

[51] Int. Cl.$^4$ ............................................. C08G 73/00
[52] U.S. Cl. ..................................... 528/422; 528/88; 528/92; 528/119
[58] Field of Search ................... 528/422, 88, 92, 119

[56] References Cited

U.S. PATENT DOCUMENTS

| | | | |
|---|---|---|---|
| 3,694,410 | 9/1972 | Oehmke | 260/47 R |
| 3,962,184 | 6/1976 | Notomi et al. | 260/47 CP |
| 4,026,913 | 5/1977 | Tanigaichi et al. | 260/463 |
| 4,110,364 | 8/1978 | Gaku et al. | 528/170 |
| 4,195,132 | 3/1980 | Sundermann et al. | 521/155 |
| 4,330,658 | 5/1982 | Ikeguchi et al. | 528/73 |
| 4,330,669 | 5/1982 | Ikeguchi et al. | 528/289 |
| 4,429,112 | 1/1984 | Gaku et al. | 528/422 |
| 4,528,366 | 7/1985 | Woo et al. | 528/422 |

*Primary Examiner*—Harold D. Anderson
*Attorney, Agent, or Firm*—Herbert P. Price

[57] ABSTRACT

Polycyanate esters of polyhydric phenols are cured with a liquid solution of a coordinating transition metal carboxylate in a monohydric alcohol. Such cured compositions are useful in structural composites, transfer molded encapsulants, filmed structural adhesives and printed wiring boards.

27 Claims, No Drawings

METAL CARBOXYLATE/ALCOHOL CURING CATALYST FOR POLYCYANATE ESTER OF POLYHYDRIC PHENOL

BACKGROUND OF THE INVENTION

The field of art to which this invention pertains is cyanate esters and catalysts for curing such esters.

Cyanate esters, which are described in U.S. Pat. No. 3,553,244, are prepared by reacting polyhydric phenols with cyanogen chloride. Such cyanate esters can be cured by heat alone, but, preferably, are cured by using a catalyst plus heat to form thermoset resins useful as laminating and molding resins. In U.S. Pat. No. 3,962,184, the use of zinc octoate, catechol and triethylenediamine as catalysts for cyanate esters is described. This patent also describes the use of imidazoles alone or combined with organic metal salts, such as zinc octoate, tin octoate, tetrabutyl ester of titanic acid, zinc stearate, tin stearate, or calcium stearate, and phenolic compounds, such as phenol or catechol.

Other references which disclose metal salts and/or aromatic hydroxy compounds as catalysts for cyanate esters are U.S. Pat. Nos. 4,026,913; 4,110,367; 4,195,132; 4,429,112; 4,330,,658 and 4,330,669.

Chelates of iron, cobalt, zinc, copper, manganese, zirconium, titanium, vanadium, aluminum and magnesium with bidentate ligands, e.g., catechol, are described as being useful to catalyze the cure of cyanate esters in U.S. Pat. No. 3,694,410.

Metal salts, when used as catalysts, do not readily dissolve in the cyanate esters. They can form insoluble or gel-encrusted coated droplets which remain as undesirable particulates in the cured compositions. Also such catalysts require high temperatures and/or long cure times in order to complete the cure. Complete cures are obtained when substantially all of the cyanate ester groups are reacted to form triazine ring structures. Compositions which are incompletely cured will whiten, blister, become embrittled, or even soften to a slime consistency when exposed to steam over a period of time.

SUMMARY OF THE INVENTION

This invention relates to curable compositions made from polycyanate esters of polyhydric phenols. In one aspect, this invention pertains to curable compositions which are made from polycyanate esters and liquid, readily soluble, catalysts. In another aspect, this invention relates to catalyzed polycyanate ester compositions which cure completely to form heat and moisture resistant thermoset compositions.

The curable compositions of this invention are made from a polycyanate ester of a polyhydric phenol and a catalyst which is a liquid solution of a metal carboxylate and an alcohol. The metal carboxylate is a metal salt of an acid which contains 4 carbons atoms up to about 24 carbon atoms, wherein the metal is classified as a transition metal cation and is characterized as coordinating, i.e., having 9 or more electrons in the next-to-outermost shell. The most useful of these transition metal cations are copper, manganese, tin, lead, zinc, cobalt, and nickel, all in the divalent state; iron and chromium, both in the trivalent state; and tetravalent titanium. The alcohol is a monohydric alcohol which is liquid at room temperature, which has a boiling point greater than 160° C. at 760 mm Hg pressure and which has a solubility of less than 10 percent by weight in water. The metal carboxylate is used in an amount to provide from about 0.001 to about 0.5 part of metal per 100 parts of the polycyanate. The alcohol is used in an amount to provide from about 3 to about 100 milliequivalents of active hydrogen per equivalent of cyanate group. The catalyst blend, that is, the metal carboxylate dissolved in the alcohol, is used in the amount of about 0.5 to about 20 parts by weight per 100 parts by weight of polycyanate.

DESCRIPTION OF THE INVENTION

The polycyanate esters of polyhydric phenols useful in this invention are described in U.S. Pat. No. 3,553,244, which is hereby incorporated by reference. These polycyanate esters, which contain more than one cyanate ester group per molecule, are prepared by reacting a cyanogen halide with a polyhydric phenol. Examples of cyanogen halides are cyanogen iodide, cyanogen bromide and cyanogen chloride, with cyanogen chloride being preferred. Polyhydric phenols, from which these polycyanate esters are derived, include resorcinol, p,p'-dihydroxy-diphenyl, o,p'-dihydroxydiphenyl methane, p,p'-dihydroxydiphenyl propane (bisphenol A as it is commonly called), p,p'-dihydroxydiphenyl sulfone, p,p'-dihydroxydiphenyl sulfide, p,p'-dihydroxydiphenyl oxide, 4,4'-methylenebis(2,6-dimethylphenol), 4,4'-(hexafluoroisopropylidene)diphenol, p,p'p'-trihydroxytriphenyl phosphate, dihydroxy naphthalene and novolac resins which contain more than 2 phenol moieties per molecule. A preferred polycyanate ester is the dicyanate ester of bisphenol A, with the most preferred being the dicyanate ester of bisphenol A having a purity equal to, or greater than, 99.0 mole percent. Partially trimerized dicyanates, termed prepolymers, which characteristically have from about 5% to about 60% of the monomeric functionality converted to triazine (or cyanurate) rings by heat processing with attendant increase in molecular weight are also catalyzed by the metal carboxylates and monohydric alcohols of this invention. The monomeric polycyanates and prepolymers obtained therefrom can be catalyzed as neat liquids, hot melts or liquid solutions.

The metal carboxylates useful in this invention are the transition metal soaps of $C_4$ to about $C_{24}$ carboxylic acids. Many of these metal carboxylates are sold as "driers" for oleoresinous coatings and varnishes. The metals useful in this invention are classified as transition metal cations, and are characterized as coordinating, i.e., having 9 or more electrons in the next-to-outermost shell. Examples of these transition metal cations are copper, manganese, nickel, cobalt, zinc, lead and tin, all in the divalent state; iron and chromium, both in the trivalent state; and titanium in the tetravalent state. The carboxylic acid portion of the metal carboxylate contains 4 up to about 24 carbon atoms per molecule. Such acids are butanoic acid, acetoacetic acid, pentanoic acid, hexanoic acid, heptanoic acid, decanoic acid, dodecanoic acid, naphthenic and naphthanoic acids, abietic acid, and the fatty acids derived from vegetable and tall oils. Preferred metal carboxylates are the naphthenates of copper, manganese, nickel, cobalt and zinc, with copper naphthenate being the most preferred.

Alcohols useful in this invention dissolve the metal carboxylates forming stable solutions. Such alcohols are monohydric alcohols which are liquid at room temperature (25° C.), which are high boiling, i.e., having a boiling point above 160° C. at 760 mm Hg pressure and which are hydrophobic, i.e., having a solubility of less than 10 percent by weight in water. Examples of such alcohols are aliphatic alcohols which contain at least 5 carbon atoms, aryl substituted alcohols, cycloaliphatic alcohols and alkyl ether glycols wherein the alkyl group contains at least 5 carbon atoms. Useful aliphatic alcohols include pentanol, hexanol, octanol, 2-ethylhexanol, decanol, dodecanol and the like. Useful aryl substituted alcohols are benzyl alcohol and alkylated benzyl alcohol such as p-butyl benzyl alcohol. Examples of cycloaliphatic alcohols are 5-norbornene-2-methanol, 6,6-dimethylbicyclo-[3.1.1]hept-2-ene-2-ethanol, terpineol, and the like. Examples of alkyl ether glycols are alkyl ethers of ethylene glycol, propylene glycol and butylene glycol wherein the alkyl group contains 5 to about 18 carbon atoms, such as the monoamyl ether of propylene glycol, the monohexyl ether of ethylene glycol and the like. These alcohols are used in the amount of about 3 to about 100 milliequivalents of active hydrogen per cyanate equivalent in the polycyanate of the polyhydric phenol. Minor portions of polyols can be used in conjunction with the monohydric alcohols provided that the blends are liquid at room temperature.

The catalyst solution, i.e, the metal carboxylate dissolved in the alcohol, is used in the amount of about 0.5 to about 20 parts by weight per 100 parts by weight of the polycyanate and, preferably, about 1.0 to about 8 parts by weight per 100 parts by weight of the polycyanate.

The compositions of this invention can be cured by heating at elevated temperature for a time sufficient to obtain a complete cure. The curing reaction can be conducted at one temperature or can be conducted by heating in steps. If conducted at one temperature, the curing temperatures will vary from about 250° to about 450° F. When conducted by stepwise heating, the first step, or gelation step, is performed at a temperature of about 150° to about 350° F. The curing step is conducted at a temperature of about 300° to about 450° F., and the optional post-curing step is conducted at a temperature of about 400° to about 500° F. Generally the overall curing reaction will take from about 5 minutes to about 8 hours.

When the polycyanate and the curing catalyst of this invention are heated, the aromatic cyanate functionality trimerizes more extensively leaving less than 20%, preferably, less than 5%, of the original cyanate groups untrimerized. Unreacted cyanate groups in the cross-linked resin lower thermal performance and are especially deleterious to performance measured after conditioning in moist environments. With exposure to water or water vapor, cyanates hydrolyze to carbamate esters, which are both hydrophilic and function as carbon dioxide blowing agents at elevated temperatures. Residual cyanate groups in polycyanurate networks result in higher moisture absorption, which advesely affects: (a) dimensional stability (swelling and higher coefficients of thermal expansion); (b) mechanical strength and stiffness at elevated temperatures (lower heat distortion temperature); (c) electrical insulating properties; (d) stability in contact with molten solders; and (e) cyanurate hydrolysis, blistering and outgassing.

The catalysts of this invention are also useful in curing blends of polycyanate esters and polyepoxide resins wherein up to about 70 weight percent of the blend is the polyepoxide resin. Such polyepoxide resins are the well-known glycidyl ethers of polyhydric phenols which are made by reacting an epihalohydrin, preferably, epichlorohydrin, with a polyhydric phenol. Such polyhydric phenols are described hereinbefore in the description of polycyanate esters. Preferred polyepoxide resins are those derived from bisphenol A and tetrabromobisphenol A having an epoxide equivalent weight of about 180 to about 750.

When formulating for particular end uses, additional components can be incorporated in the polycyanate compositions. Such components include minor amounts of thermoplastic resin tougheners, reinforcing fibers, colloidal silica flow modifiers, mineral fillers and pigments.

The cured composition of this invention can be used in vacuum bagged structural composites, transfer molded encapsulants, filmed structural adhesives, printed wiring boards and composites for aircraft primary structures. Manufacturers of printed wiring boards, structural composites and plastic encapsulated semiconductors prefer that curing be accomplished at temperatures of 350° F. or below.

The invention is described in more detail in the following examples. Parts and percentages, unless otherwise indicated, are parts and percentages by weight.

EXAMPLE 1

A catalyst package was prepared by blending 1.3 parts of benzyl alcohol with 0.25 part of copper naphthenate (8% Cu grade from Mooney Chemical Company). A clear liquid was obtained. Bisphenol a dicyanate monomer (100 parts), analyzing 99.7 mole percent pure by Differential Scanning Calorimeter (DSC) melt analysis, was melted in a 250 ml. 3-neck flask in an oil bath. At a temperature of 200° F., the above described catalyst package was added and stirred to dissolve the catalyst into the molten dicyanate. Catalyst concentrations were 0.02 part per hundred resin (phr) copper (as metal) and 16 milliequivalents (meq) active hydrogen per cyanate equivalent. Afer vacuum deairing, the catalyzed dicyanate melt was poured into an aluminum sheet mold preheated to 220° F. The molten material gelled in 120 minutes at 220° F., after which the oven temperature was increased to 350° F. and the casting was cured for a period of 3 hours. An optically clear, yellow casting of ⅛ inch thickness was obtained, ½ of which was sawed and milled without chipping into a series of test bars. The following properties were obtained:

| Heat Distortion Temperature, 264 psi | |
|---|---|
| Tested Dry | 156° C. |
| Tested Wet[1] | 129° C. |
| Specific Gravity, 25/25° C. | 1.223 |
| Tensile Strength | 9,600 psi |
| Tensile Strain-At-Break | 1.9% |
| Tensile Modulus | 0.54 × 10$^6$ psi |
| Flexure Strength | 22,500 psi |
| Flexural Strain | 4.4% |
| Flexural Modulus | 0.53 × 10$^6$ psi |
| Methylene Chloride Absorption | |
| 1 Hr. @ 25° C. | 17.9 |
| 2 Hrs. @ 25° C. | 32.6 |
| Hot Moisture Vapor Absorption[1] | 1.6% by wt. |

[1]Conditioned 64 hours at 200° F. and >95% R.H.

No visual change was apparent in the test bars immersed in solvent and 200° F. moisture vapor.

A second portion of the casting was post-cured for 1 hour at 450° F. and tested in an identical manner. The results, shown below, indicate that aside from an expected increase in dry HDT, little improvement in performance is achieved with higher temperature curing.

| Heat Distortion Temperature | |
|---|---|
| Tested Dry | 237° C. |
| Tested Wet[1] | 148° C. |

| | |
|---|---|
| Specific Gravity, 25/25° C. | 1.203 |
| Flexure Strength | 24,600 psi |
| Flexure Strain | 6.5% |
| Flexure Modulus | 0.43 × 10⁶ psi |
| Methylene Chloride Absorption | |
| 1 Hr. @ 25° C. | 2.4% by wt. |
| 3 Hrs. @ 25° C. | 6.6% by wt. |
| Hot Moisture Vapor Absorption[1] | 1.4% by wt. |

[1]Conditioned 64 hours at 200° F. and >95% R.H.

EXAMPLE 2

To demonstrate the effectiveness of the use of the combination of metal and active hydrogen compound as catalyst versus the metal without active hydrogen compound and the active hydrogen compound without metal, the molten dicyanate ester of bisphenol A having a purity of 99.7% was mixed with the following reactants and was heated to form a thermoset plastic and evaluated: (A) benzyl alcohol and copper naphthenate solution; (B) dibutylphthalate and copper naphthenate solution; (C) benzyl alcohol; (D) copper naphthenate.

In (B) the copper naphthenate was dissolved in dibutylphthalate, which contains no active hydrogen. The amounts of each component and the cured properties are listed in Table I.

TABLE I

| | A | B | C | D |
|---|---|---|---|---|
| Material | | | | |
| Dicyanate Ester | 160 | 160 | 160 | 160 |
| Benzyl Alcohol | 3.92 | | 3.92 | |
| Dibutyl Phthalate | | 8.0 | | |
| Copper Naphthenate (8% Cu) | 0.50 | 0.50 | | 0.50 |
| Active H Equiv. per Cyanate Equiv. | 0.032 | | 0.032 | |
| Metal Catalyst, % Cu | 0.025 | 0.025 | | 0.025 |
| Catalyst Preblend Description | | | | |
| Appearance, Physical State | Clear Liquid | Clear Liquid | | |
| Viscosity, Gardner-Holdt 25° C. | A₄ | A₄ | | |
| Stability, 17 days R.T. | OK | OK | | |
| Gel Time, Min. @ 220° F. | 30 | 75 | >1440 | 25 |
| Properties-Cured 3 hrs. @ 350° F. | | | | |
| Uniformity of Casting | OK | OK | | Specks |
| Heat Distortion Temp. °C. | | | | |
| Tested Dry | 154 | 130 | UNCURED | 164 |
| Tested Wet[1] | 142 | Slimed[2] | UNCURED | 120 |
| % H₂O Absorption[1] | 1.3 | High | UNCURED | 2.0 |
| Tensile Strength, psi | 10,000 | 11,200 | UNCURED | 5,600 |
| Tensile Strain at Break, % | 2.0 | 2.3 | UNCURED | 1.1 |
| Tensile Modulus, 10⁶ psi | 0.54 | 0.54 | UNCURED | 0.52 |
| Steam Absorption at 250° F., % | | | | |
| 6 hours | 0.6 OK | 2.1 BL | | 1.1 OK |
| 25 hours | 1.6 OK | — | | 3.0 BL |
| 96 hours | 3.1 OP | — | | Slimed[2] |
| Properties Post-Cured 1 Hour at 450° F. | | | | |
| Heat Distortion Temp. °C. | | | | |
| Tested Dry | 217 | 185 | | 188 |
| Tested Wet[1] | 180 | 126 | | 131 |
| % H₂O Absorption[1] | 1.4 | 1.6 | | 2.0 |
| Flexure Strength, psi | 22,400 | 22,900 | | 13,000 |
| Flexural Strain at Break, % | 5.0 | 5.4 | | 3.0 |
| Flexural Modulus, 10⁶ psi | 0.48 | 0.49 | | 0.49 |
| Steam Absorption at 250° F., % | | | | |
| 6 hours | 0.8 OK | 0.9 OK | | 1.0 OK |
| 25 hours | 1.5 OK | 1.8 OK | | 2.2 OP |
| 96 hours | 2.3 OK | 2.3 OK | | 5.2 BL |

[1]Conditioned 64 hours at 200° F. and >95% Relative Humidity.
[2]Indicates hydrolysis of cyanurate linkages.
OP Opaque due to excessive moisture absorption.
BL Blistered, indicates surface hydrolysis.
NA Not Applicable
OK No visual change; tough

EXAMPLE 3

Using the same procedure described in Example 1, the dicyanate ester of bisphenol A was cured with copper naphthenate predissolved in the monohexyl ether of ethylene glycol (Hexyl Cellosolve). The amounts of each component and the cure properties are listed in Table II.

TABLE II

| CATALYST EFFECTS (Cu in Hexyl Cellosolve) IN DICYANATE ESTER CASTINGS | | |
|---|---|---|
| | A | B |
| Composition (Wt.) | | |
| Dicyanate Ester Monomer | 100 | 100 |
| Copper Naphthenate, 8% Cu | 0.37 | 0.37 |
| Hexyl Cellosolve | 4.0 | 2.62 |
| Catalyst Concentration: | | |
| Cu as metal, phr | 0.03 | 0.03 |
| Active H, equiv./OCN | 0.0278 | 0.0182 |

TABLE II-continued
CATALYST EFFECTS (Cu in Hexyl Cellosolve) IN DICYANATE ESTER CASTINGS

|  | A | B |
|---|---|---|
| Gel Time, Min. @ 220° F. | 1 | 19 |
| Cured 3 Hours @ 350° F. | | |
| Heat Distortion Temp. °C. | | |
| Tested Dry | 174 | 182 |
| Tested Wet[1] | 140 | 156 |
| % $H_2O$ Absorption[1] | 1.26 | 0.90 |
| Tensile Strength, psi | 9,600 | 9,700 |
| Tensile Strain, % | 2.1 | 2.1 |
| Tensile Modulus, $10^6$ psi | 0.49 | 0.49 |
| Flexure Strength, psi | 24,700 | 25,800 |
| Flexural Strain, % | 6.2 | 5.9 |
| Flexural Modulus, $10^6$ psi | 0.50 | 0.50 |
| $MeCl_2$ Absorption, Wt. % | | |
| 1 Hour @ 25° C. | 3.34 | 2.57 |
| 3 Hours @ 25° C. | 22.2 | 19.7 |
| Specific Gravity @ 25° C. | 1.21 | 1.207 |
| Steam Absorption, Wt. % | | |
| 6 Hours @ 250° F. | 0.7 OK | 0.7 OK |
| 22 Hours @ 250° F. | 1.5 OK | 1.4 OK |
| 46 Hours @ 250° F. | 2.0 OK | 1.9 OK |
| 94 Hours @ 250° F. | 2.1 OK | 2.2 OK |
| Post-Cured 1 Hour @ 450° F. | | |
| Heat Distortion Temp. °C. | | |
| Tested Dry | 218 | 225 |
| Tested Wet[1] | 138 | 149 |
| % $H_2O$ Absorption[1] | 1.55 | 1.44 |
| Flexure Strength, psi | 25,400 | 24,400 |
| Flexural Strain, % | 9.3 | 7.1 |
| Flexural Modulus, $10^6$ psi | 0.47 | 0.44 |
| $MeCl_2$ Absorption, Wt. % | | |
| 1 Hour @ 25° C. | 1.79 | 1.97 |
| 3 Hours @ 25° C. | 9.5 | 8.4 |
| Specific Gravity @ 25° C. | 1.198 | 1.198 |
| Steam Absorption, Wt. % | | |
| 6 Hours @ 250° F. | 1.0 OK | 1.0 OK |
| 22 Hours @ 250° F. | 1.7 OK | 1.7 OK |
| 47 Hours @ 250° F. | 1.9 OK | 2.0 OK |
| 94 Hours @ 250° F. | 2.0 OK | 2.1 OK |

[1]Conditioned 64 hours @ 200° F. and >95% Relative Humidity
OK No visual change; tough

EXAMPLE 4

A catalyst blend was prepared by heating and stirring 13 parts of liquid diglycidyl ether of bisphenol A having an epoxide equivalent weight of 185 with 1.0 part of zinc octoate (18% Zn grade) until a clear liquid was obtained. Upon cooling the blend was a viscous hazy, but uniform, liquid. The high purity grade of bisphenol A dicyanate used in the previous examples was melted and 140 parts were mixed at 200° F. with 1.4 parts of the zinc octoate/liquid epoxy resin catalyst to form a clear, uniform catalyzed melt containing 0.013 phr zinc (as metal) and <5 meq. of active hydrogen per cyanate group. The melt was poured into an aluminum mold preheated to 300° F. and gelled within 5 minutes. After curing a total of 3 hours at 450° F. plus 2 hours at 482° F., the casting was sawed and milled into test bars. A dry Heat Distortion Temperature (HDT) value of 226° C. was obtained. After conditioning 64 hours at 200° F. and >95% Relative Humidity in a humidity chamber, the bar had absorbed 3.08% moisture and had partially hydrolyzed as noted by a slimy outer layer and warped appearance.

This example shows that even long, high temperature curing cycles are incapable of complete cyanate trimerization when the dicyanate is of high purity and no active hydrogen compounds are incorporated.

EXAMPLE 5

Using the same procedure described in Example 1, catalyst packages were prepared from a number of transition metal carboxylates and benzyl alcohol. Again using the procedure described in Example 1, bisphenol A dicyanate monomer was cured with the catalyst blends. Details of the composition and the cured properties are listed in Table III.

TABLE III
METAL CARBOXYLATE CATALYSTS IN BENZYL ALCOHOL

|  | A | B | C | D |
|---|---|---|---|---|
| Composition (Wt.) | | | | |
| Dicyanate Ester Monomer | 160.0 | 160.0 | 160.0 | 160.0 |
| Benzyl Alcohol | 3.1 | 3.1 | 3.1 | 3.1 |
| Copper Naphthenate, 8% Cu | 0.60 | — | — | — |
| Stannous Oct., 29.2% Sn | — | 0.055 | — | — |
| Manganese Naph., 6% Mn | — | — | 0.98 | — |
| Zn Naph., 8% Zn | — | — | — | 0.16 |
| phr Benzyl Alcohol | 1.94 | 1.94 | 1.94 | 1.94 |
| phr Metal | 0.03 | 0.01 | 0.037 | 0.008 |
| Active H Eq./phr | 0.018 | 0.018 | 0.018 | 0.018 |
| Minutes to Gel @ 220° F. | 26 | 103 | 15 | >120; +25 Min. @250° F. |
| 3 Hours @ 350° F. Cure: | | | | |
| Heat Distortion Temp °C. | | | | |
| Tested Dry | 171 | 146 | 159 | 147 |
| Tested Wet[1] | 135 | 141 | 130 | 133 |
| % $H_2O$ Absorption[1] | 1.20 | 1.27 | 0.97 | 0.70 |
| Flexural Strength, psi | 23,000 | 20,500 | 19,500 | 22,400 |
| Flexural Strain, % | 4.82 | 3.95 | 3.83 | 4.40 |
| Flexural Modulus, $10^6$ psi | 0.50 | 0.54 | 0.53 | 0.54 |
| Tensile Strength, psi | 11,000 | 13,000 | 10,100 | 8,900 |
| Tensile Strain, % | 2.2 | 2.6 | 2.0 | 1.7 |
| Tensile Modulus, $10^6$ psi | 0.52 | 0.56 | 0.54 | 0.55 |
| Specific Gravity | 1.223 | 1.228 | 1.225 | 1.230 |
| Post Cured 1 Hr. @ 450° F. | | | | |
| Heat Distortion Temp °F. | | | | |
| Tested Dry | 241 | 225 | 223 | 220 |
| Tested Wet[1] | 140 | 150 | 141 | 184 |

TABLE III-continued

| METAL CARBOXYLATE CATALYSTS IN BENZYL ALCOHOL | | | | |
|---|---|---|---|---|
| | A | B | C | D |
| % H$_2$O Absorption[1] | +1.46 | +1.49 | +1.32 | +0.99 |
| Flexural Strength, psi | 21,600 | 17,600 | 18,100 | 22,700 |
| Flexural Strain, % | 6.12 | 3.89 | 3.92 | 6.35 |
| Flexural Modulus, 10$^6$ psi | 0.45 | 0.47 | 0.48 | 0.46 |
| Specific Gravity | 1.213 | 1.217 | 1.216 | 2.219 |

[1]Conditioned 64 hours @ 200° F. and >95% relative humidity.

EXAMPLE 6

Using the same procedure described in Example 1, the dicyanate ester of 4,4'-methylenebis(2,6-dimethylphenol) was cured with a catalyst blend of copper naphthenate in benzyl alcohol and zinc naphthenate in benzyl alcohol. Details of the compositions and cured properties are listed in Table IV.

TABLE IV

| CATALYSIS OF DICYANATE ESTER OF 4,4'-METHYLENEBIS(2,6-DIMETHYLPHENOL) | | |
|---|---|---|
| Example | 6A | 6B |
| Catalyst Package | | |
| Copper Naphthenate | 8% Cu | |
| Zinc Naphthenate | | 8% Zn |
| Metal Concentration (phr) | 0.05 | 0.035 |
| Benzyl Alcohol (phr) | 2.9 | 2.9 |
| Reactivity | | |
| Casting Gel Time, Minutes @ 250° F. | 105 | 165 |
| HDT (°C.) Vs. Cure | | |
| 1 Hr. @ 350° F. +1 Hr. @ 400° F. | 185 | 167 |
| Above +1 Hr. @ 482° F. | 233 | 230 |
| Above +1 Hr. @ 520° F. | 223 | 236 |
| Initial Cure[1] Properties | | |
| Tensile Strength, psi | 8100 | 3400 |
| Tensile Strain, % | 2.0 | 0.8 |
| Tensile Modulus, 10$^6$ psi | 0.42 | 0.42 |
| Flexure Strength, psi | 20,600 | 16,700 |
| Flexure Strain, % | 5.1 | 3.4 |
| Flexure Modulus, 10$^6$ psi | 0.44 | 0.48 |
| % H$_2$O Absorption[2] | 0.86 | 0.71 |
| % MeCl$_2$ Absorption, 1 hr. @ R.T. | 21.9 | 24.2 |
| Specific Gravity, 25° C. | 1.134 | 1.139 |
| Properties Post Cured (P.C.) 1 Hr. @ 482° F. | | |
| Flexure Strength, psi | 18,400 | 21,100 |
| Flexure Strain, % | 4.6 | 6.2 |
| Flexure Modulus, 10$^6$ psi | 0.43 | 0.42 |
| % H$_2$O Absorption[2] | 1.10 | 1.07 |
| % MeCl$_2$ Absorption, 1 Hr. @ R.T. | 1.4 | 3.1 |
| Specific Gravity, 25° C. | 1.122 | 1.116 |
| Wet[2] Heat Distortion Temperature (HDT) | | |
| 1 Hr. @ 350° F. +1 Hr. @ 400° F. | | |
| HDT, °C. | 179 | 156 |
| % H$_2$O Absorption | 0.86 | 0.71 |
| P.C. 1 Hr. @ 482° F. | | |
| HDT, °C. | 239 | 235 |
| % H$_2$O Absorption | 1.10 | 0.91 |

[1]1 Hour @ 350° F. + 1 Hr. @ 400° F.
[2]Conditioned 64 hours @ 200° F. and >95% R.H.

EXAMPLE 7

The dicyanate ester of bisphenol A, 64 parts, was blended with 46 parts of a glycidyl polyether of tetrabromobisphenol A having an epoxide equivalent weight of 675 and 50 parts of a diglycidyl ether of bisphenol A having an epoxide equivalent weight of 190 at a temperature of 210° F. A blend of 0.30 part of zinc naphthenate (8% zinc) and 1.7 parts of benzyl alcohol was added to the resin blend at 200° F. and was well mixed and deaired. The molten mixture was poured into an aluminum sheet mold preheated to 220° F. The resinous mixture gelled in 25 minutes at 220° F. The gelled casting was then heated at 350° F. for one hour. One-half of the casting was sawed and milled without chipping into a series of test bars. Infrared spectra of the casting showed no residual cyanate or epoxy groups. The following properties were obtained from the test bars:

| Heat Distortion Temperature, 264 psi | |
|---|---|
| Tested Dry | 170° C. |
| Tested Wet[1] | 147° C. |
| % Specific Gravity, 25/25° C. | 1.324 |
| Tensile Strength | 8,300 psi |
| Tensile Strain-At-Break | 1.7% |
| Tensile Modulus | 0.53 × 10$^6$ psi |
| Flexure Strength | 25,300 psi |
| Flexure Strain-At-Break | 5.9% |
| Flexure Modulus | 0.51 × 10$^6$ psi |
| Methylene Chloride Absorption[2] | |
| 1 Hour | 0.95% OK |
| 3 Hours | 2.35% OK |
| 6 Hours | 4.49% F |
| Hot Moisture Vapor Absorption[1] | 1.34% |
| Steam Absorption[3] | |
| 6 Hours | 0.79% OK |
| 22 Hours | 1.51% OK |
| 46 Hours | 1.92% OK |
| 94 Hours | 2.42% V.B. |

A second portion of the casting was post cured for 1 hour at 420° F. and was tested as described above.

| Heat Distortion Temperature | |
|---|---|
| Tested Dry | 188° C. |
| Tested Wet[1] | 159° C. |
| Specific Gravity | 1.318 |
| Flexure Strength | 17,400 psi |
| Flexure Strain | 3.8% |
| Flexure Modulus | 0.50 × 10$^6$ psi |
| Methylene Chloride Absorption[2] | |
| 1 Hour | 0.56 OK |
| 3 Hours | 1.50 OK |
| 6 Hours | 2.98 E.S. |
| Hot Moisture Vapor Absorption[1] | 1.45% |
| Steam Absorption[3] | |
| 6 Hours | 0.79% OK |
| 22 Hours | 1.39% OK |
| 46 Hours | 1.56% OK |
| 94 Hours | 1.70% OK |

[1]Conditioned 64 hours at 200° F. and >95% R.H.
[2]Immersed at 77° F.
[3]Immersed in 15 psi steam at 250° F.
OK No visual change - Tough.
F Fragments falling off edges.
E.S. Edge Swelling
V.B. Very Brittle The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed:

1. A curable composition comprising a polycyanate ester of a polyhydric phenol and a catalyst blend comprising a liquid solution of a metal carboxylate in a monohydric alcohol wherein the metal is a coordinating transition metal having 9 or more electrons in its next-to-outermost shell, wherein the carboxylate contains 4 to about 24 carbon atoms and wherein the monohydric alcohol is liquid at room temperature, has a boiling point greater than 160° C. at 760 mm Hg pressure and has a solubility of less than 10 percent by weight in water.

2. The composition of claim 1 wherein the metal is present in the amount of about 0.001 to about 0.5 part by weight per 100 parts by weight of the polycyanate and wherein the monohydric alcohol is present in the amount of about 3 to about 100 milliequivalents of active hydrogen per equivalent of cyanate group.

3. The composition of claim 2 wherein the blend of metal carboxylate and monohydric alcohol is present in the amount of about 0.5 to about 20 parts by weight per 100 parts by weight of the polycyanate ester.

4. The composition of claim 3 wherein the blend is present in the amount of about 1.0 to about 8 parts by weight per 100 parts by weight of the polycyanate ester.

5. The composition of claim 1 wherein the metal is selected from the group consisting of divalent copper, manganese, tin, lead, zinc, cobalt and nickel, trivalent iron and chromium, and tetravalent titanium.

6. The composition of claim 1 wherein the metal is selected from the group consisting of copper, manganese, nickel, cobalt and zinc.

7. The composition of claim 1 wherein the metal carboxylate is copper naphthenate.

8. The composition of claim 1 wherein the monohydric alcohol is selected from the group consisting of aliphatic alcohols which contain at least 5 carbon atoms, aryl substituted alcohols, cycloaliphatic alcohols and alkyl ether glycols wherein the alkyl group contains at least 5 carbon atoms.

9. The composition of claim 1 wherein the monohydric alcohol is benzyl alcohol.

10. The composition of claim 1 wherein the polycyanate ester is the dicyanate ester of p,p'-dihydroxydiphenyl propane.

11. The composition of claim 1 wherein the polycyanate ester is the dicyanate ester of 4,4'-methylenebis(2,6-dimethylphenol).

12. The composition of claim 1 wherein up to 70 weight percent of the polycyanate ester of the polyhydric phenol is replaced with a glycidyl ether of a polyhydric phenol.

13. The composition of claim 12 wherein the glycidyl ether is the diglycidyl ether of p,p'-dihydroxydiphenyl propane.

14. A process for preparing a cured composition which comprises mixing a polycyanate ester of a polyhydric phenol with a catalyst blend comprising a liquid solution of a metal carboxylate in a monohydric alcohol, wherein the metal is a coordinating transition metal having 9 or more electrons in its next-to-outermost shell, wherein the carboxylate contains 4 to about 24 carbon atoms and wherein the monohydric alcohol is liquid at room temperature, has a boiling point greater than 160° C. at 760 mm Hg pressure and has a solubility of less than 10 percent by weight in water, then heating the resulting mixture at a temperature of about 250° to about 450° F. for a time sufficient to cure the mixture.

15. The process of claim 14 wherein the mixture is cured by stepwise heating wherein the first step or gelation step is conducted at a temperature of about 150° to about 350° F. and wherein the second step or curing step is conducted at a temperature of about 300° to about 450° F.

16. The process of claim 15 wherein the mixture is post-cured at a temperature of about 400° to about 500° F.

17. The process of claim 14 wherein the metal is present in the amount of about 0.001 to about 0.5 part by weight per 100 parts by weight of the polycyanate and wherein the monohydric alcohol is present in the amount of about 3 to about 100 milliequivalents of active hydrogen per equivalent of cyanate group.

18. The process of claim 17 wherein the blend of metal carboxylate and monohydric alcohol is present in the amount of about 0.5 to about 20 parts by weight per 100 parts by weight of the polycyanate ester.

19. The process of claim 18 wherein the blend is present in the amount of about 1.0 to about 8 parts by weight per 100 parts by weight of the polycyanate ester.

20. The process of claim 14 wherein the metal is selected from the group consisting of divalent copper, manganese, tin, lead, zinc, cobalt and nickel, trivalent iron and chromium, and tetravalent titanium.

21. The process of claim 14 wherein the metal carboxylate is copper naphthenate.

22. The process of claim 14 wherein the monohydric alcohol is selected from the group consisting of aliphatic alcohols which contain at least 5 carbon atoms, aryl substituted alcohols, cycloaliphatic alcohols and alkyl ether glycols wherein the alkyl group contains at least 5 carbon atoms.

23. The process of claim 14 wherein the monohydric alcohol is benzyl alcohol.

24. The process of claim 14 wherein the polycyanate ester is the dicyanate ester of p,p'-dihydroxydiphenyl propane.

25. The process of claim 14 wherein the polycyanate ester is the dicyanate ester of 4,4'-methylenebis (2,6-dimethylphenol).

26. The process of claim 14 wherein up to 70 weight percent of the polycyanate ester of the polyhydric phenol is replaced with a glycidyl ether of a polyhydric phenol.

27. The process of claim 26 wherein the glycidyl ether is the diglycidyl ether of p,p'-dihydroxydiphenyl propane.

* * * * *